(12) United States Patent
Nunez et al.

(10) Patent No.: US 6,338,121 B1
(45) Date of Patent: Jan. 8, 2002

(54) DATA SOURCE ARBITRATION IN A MULTIPROCESSOR SYSTEM

(75) Inventors: Jose Melanio Nunez; Thomas Albert Petersen, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/315,539

(22) Filed: May 20, 1999

(51) Int. Cl.$^7$ .............................................. G06F 12/08
(52) U.S. Cl. ...................................... 711/140; 711/150
(58) Field of Search ............................... 711/140, 150, 711/151, 158

(56) References Cited

U.S. PATENT DOCUMENTS

| 6,148,372 A | * 11/2000 | Mehrotra et al. ........... 711/122 |
| 6,150,724 A | * 11/2000 | Wenzel et al. .............. 257/777 |
| 6,182,196 B1 | * 1/2001 | De Roo ...................... 711/144 |

* cited by examiner

Primary Examiner—Kevin L. Ellis
(74) Attorney, Agent, or Firm—Joseph P. Lally; Anthony V. S. England (57) ABSTRACT

A multiprocessor computer system including a set of processors connected to a memory subsystem via a local interconnect. The memory subsystem includes a load miss block suitable for queuing a first processor load operation that misses in an L1 cache of the first processor and a store miss block suitable for queuing store type operations. The subsystem further includes an arbiter suitable for receiving queued operations from the load and store miss blocks. The arbiter is further configured for selecting one of the received operations and initiating the selected operation. The subsystem further includes means for snooping the address associated with the first processor load operation when the first processor load operation is selected and initiated by the arbiter. The subsystem further includes a snoop control block adapted to receive a snoop response from a second processor associated with the memory subsystem. The snoop control block is further adapted to queue a store type operation in the store miss block if the snoop response from the second processor is modified. The subsystem is configured to link the store type operation with the first load operation when the store type operation is initiated. When the linked operations complete (together), the data associated with the store type operation, which is preferably written to an L2 or lower level cache, will also satisfy the first load operation. The local interconnect is preferably comprised of a unidirectional bus.

21 Claims, 8 Drawing Sheets

L2 LOAD INTERVENTION TIMING DIAGRAM

FIG.9

DATA SOURCE ARBITRATION IN A MULTIPROCESSOR SYSTEM

RELATED APPLICATIONS

The following patent applications, all filed on the filing date of this application, contain related subject matter: Nunez, Petersen, and Sullivan, Coherency Maintenance in a Multiprocessor System, Ser. No. 09/315,487, filed May 20, 1999, currently pending; Nunez and Petersen, Queue Resource Tracking in a Multiprocessor System, Ser. No. 09/315,488, filed May 20, 1999, currently pending; Nunez and Petersen, Critical Word Forwarding in a Multiprocessor System, Ser. No. 09/315,541, filed May 20, 1999, currently pending; Nunez and Petersen, Local Cache-to-Cache Transfers in a Multiprocessor System, Ser. No. 09/315,540, filed May 20, 1999, currently pending; Nunez and Petersen, Data Source Arbitration in a Multiprocessor System, Ser. No. 09/315,540, filed May 20, 1999, currently pending; and Nunez, Podnar, and Sullivan, Intervention Ordering in a Multiprocessor System, Ser. No. 09/315,542, filed May 20, 1999, currently pending.

BACKGROUND

1. Field of the Present Invention

The present invention generally relates to the field of microprocessor based computers and more specifically to memory subsystem micro architecture in a multiprocessor system.

2. History of Related Art

Typical multiprocessor computer systems, until recently, have been designed using a set of discrete, separately packaged microprocessors. The set of microprocessors were typically interconnected via a shared or bi-directional bus commonly referred to as a host bus or local bus. The shared host bus architecture had the advantage of freeing up more pins for other signals in pin-limited microprocessor designs. In addition, the shared bus architecture implied a single active address in any given cycle that simplified arbitration and coherency management. Unfortunately, the shared bus, multiprocessor architecture requires a complex protocol for requesting and granting the system bus, retrying operations, and so forth. The complexity and handshaking inherent in the bus protocols implied by shared bus systems significantly hampers the ability to pipeline processor operations that require use of the local bus (i.e., any operation that accessed memory below the L1 cache level of the system). As fabrication technology has progressed to the point that single chip, multiprocessor devices have become a reality, little attention has been devoted to the possible architectural advancements afforded by the elimination of pin count considerations that constrained multi-chip designs. Accordingly, much of the potential for improved performance offered by single chip devices has gone unfulfilled.

SUMMARY OF THE INVENTION

The problems identified above are in large part addressed by a multiprocessor system implemented with unidirectional address and data busses between the set of processors and a memory subsystem driven by a single arbiter and a unified pipeline through which all memory subsystem operations are passed. By using a single point of arbitration, the invention greatly simplifies the micro-architecture of the memory subsystem. This simplification in architecture enables a high degree of memory subsystem operation pipelining that can greatly improve system performance.

Broadly speaking, a first embodiment of the invention emphasizing a single point of coherency arbitration and coherency enforcement includes a memory subsystem for use with a multiprocessor computer system. The memory subsystem includes an operation block adapted for queuing an operation that misses in an L1 cache of a multiprocessor. The multiprocessor is comprised of a set of processors, preferably fabricated on a single semiconductor substrate and packaged in a single device package. The memory subsystem further includes an arbiter that is configured to receive external snoop operations from a bus interface unit and a queued operation from the operation block. The arbiter is configured to select and initiate one of received operations. Coherency is maintained by forwarding the address associated with the operation selected by the arbiter to each of a plurality of coherency units. In this manner, external and internal snoop addresses are arbitrated at a single point to produce a single subsystem snoop address that is propagated to each coherency unit. Preferably, the operation block includes a load miss block suitable for queuing load type operations and a store miss block suitable for queuing store type operations. In one embodiment, the subsystem includes a unidirectional local interconnect suitable for connecting the memory subsystem and the set of processors. The coherency units preferably include the L1 cache units of the set of processors, the operation block queues, and each stage of a memory subsystem pipeline.

The first embodiment of the invention further contemplates a method of maintaining coherency in a multiprocessor computer system in which an external snoop operation is received via a system bus and an internal operation is received from the operation block. An arbitration takes place between the external and internal operations. The arbitration selects and initiates one of the operations and thereby generates a single snoop address. This single snoop address is the broadcast to each of the coherency units to generate a plurality of snoop responses. Preferably the arbitration of the operations is resolved according to a fairness algorithm such as a round robin algorithm. In one embodiment, the plurality of snoop responses are forwarded to a snoop control block unit that is adapted to monitor and modify operations queued in the operation block.

A second embodiment of the invention emphasizing resources for managing queued operations to eliminate retry mechanisms contemplates a multiprocessor computer system including a set of processors. Each processor in the set includes an execution unit for issuing operations and a processor queue suitable for queuing previously issued and still pending operations. The multiprocessor further includes means for forwarding operations issued by the processor to the processor queue and to an operation block queue of a memory subsystem that is connected to the multiprocessor. The depth of (i.e., the number of entries in) the operation block queue matches the depth of the processor queue. The processor queue, when full, inhibits the processor from issuing additional operations. In this manner, an operation issued by the processor is guaranteed an available entry in the operation block queue of the memory subsystem thereby eliminating the need for operation retry circuitry and protocols such as handshaking. Preferably, each processor queue includes a processor load queue and a processor store queue and the operation block queue includes a load queue and a store queue. In this embodiment, the depth of each of the processor load and store queues matches the depth of the operation block load and store queues respectively. In the preferred embodiment, the operation block is comprised of a load miss block that includes the operation block load queue and a store miss block that includes the operation block store queue. Still further preferably, the operation block store queue includes a set of store queues corresponding to the set of processors and the operation block load queue includes a set of load queues corresponding to the set of processors. Each queue entry preferably includes state information indicative of the status of the corresponding entry.

The second embodiment of the invention further contemplates a method of managing operation queue resources in a multiprocessor computer system. The method includes queuing an operation in a processor queue and in an operation block queue of a memory subsystem and detecting when the processor queue lacks an available entry (i.e., the queue is full). In response to detecting a processor full condition, the processor is then prevented from issuing additional operations thereby assuring that issued operations are guaranteed an entry in the operation block queue. Preferably, the step of queuing includes queuing load operations and store operations separately and queuing operations from each processor separately. In one embodiment, the step of detecting the lack of an available entry includes interpreting status bits associated with each entry in the processor queue. Preferably, the status of an operation in the processor queue is the same as the status of a corresponding operation in the operation block queue.

A third embodiment of the invention emphasizing efficient critical word forwarding contemplates a multiprocessor computer system including a multiprocessor device preferably comprised of a set of processors, each including a respective L1 cache. The multiprocessor is preferably fabricated as a single device. The computer system includes a memory subsystem comprised of a load miss block adapted for queuing a load operation issued by a first processor that misses in an L1 cache of the first processor and a store miss block adapted for queuing store type operations. An arbiter of the memory subsystem is configured to receive queued operations from the load and store miss blocks and further configured to select and initiate one of the received operations. The subsystem further includes means for forwarding the address associated with the load miss operation to a lower level cache and means for receiving a hit/miss response from the lower level cache. In the preferred embodiment, the load miss block is adapted to detect the response from lower level cache and to request a bus interface unit to fetch data via a system bus if the lower level cache responds with a miss. The bus interface unit is configured to signal the load miss block when a first portion of the fetched data is available. In response thereto, the load miss block is configured to initiate a forwarding operation that returns the first portion of the data to the requesting processor if the forwarding operation can be initiated without displacing a valid load miss operation. The store and load miss block preferably each include separate store miss queues for each processor of the multiprocessor. The bus interface unit is preferably further configured to signal the load miss block when the entire granule (i.e., cache line) of requested data is available. The forwarding operation is preferably initiated if a first stage of a load miss block pipeline is invalid at some point after the first portion of data is available, but before the entire requested data is available.

The third embodiment of the invention still further contemplates a method of fetching data from a bus interface unit for reloading a cache. Initially, a bus interface unit is requested to fetch data via a system bus. A critical data signal is received by a load miss block from the bus interface unit indicating that a critical portion of the fetched data is available. The load miss block then determines if a forwarding operation may be initiated without displacing a valid operation. Next, depending upon the result of determining whether the forwarding operation may be initiated, the forwarding operation is either initiated or retried. In one embodiment, the bus interface unit is requested to fetch data in response to receiving a miss response from an L2 or lower level cache. Preferably, the method further includes successfully arbitrating the forwarding operation and sending the critical data to a requesting processor. After the entire line of fetched data has been forwarded to the bus interface unit, the entire line is reloaded into the L1 cache.

A fourth embodiment of the invention emphasizing efficient handling of local interventions (cache-to-cache transfers) contemplates a multiprocessor computer system including a set of processors connected to a memory subsystem via a local interconnect. The memory subsystem includes a load miss block suitable for queuing a first processor load operation that misses in an L1 cache of the first processor and a store miss block suitable for queuing store type operations. The subsystem further includes an arbiter suitable for receiving queued operations from the load and store miss blocks. The arbiter is further configured for selecting one of the received operations and initiating the selected operation. The subsystem further includes means for snooping the address associated with the first processor load operation when the first processor load operation is selected and initiated by the arbiter. The subsystem further includes a snoop control block adapted to receive a snoop response from a second processor associated with the memory subsystem. The snoop control block is further adapted to queue a store type operation in the store miss block if the snoop response from the second processor is modified. The subsystem is configured to link the store type operation with the first load operation when the store type operation is initiated. When the linked operations complete (together), the data associated with the store type operation, which is preferably written to an L2 or lower level cache, will also satisfy the first load operation. The local interconnect is preferably comprised of a unidirectional bus. In the preferred embodiment, the load and store blocks each include control pipelines with corresponding stages wherein each stage has its own validity information. In this embodiment the corresponding stages of the load miss and store miss blocks are linked by simultaneously validating a first stage of the load miss block when forwarding operation is initiated (i.e., when the forwarding operation wins arbitration by the arbiter). The output of the arbiter is preferably connected to a first stage of a memory subsystem pipeline. The snoop access and L2 access are preferably initiated when the operation enters the first stage of the pipeline. In the preferred embodiment, the depth of the pipeline is sufficient to determine the snoop response and L2 access response (i.e., hit or miss) by the time an operation has reached a last stage of the pipeline.

The fourth embodiment of the invention further contemplates a method of completing a load operation in a multiprocessor system in which, responsive to a first processor load operation that misses in an L1 cache of the first processor, the load operation address is snooped. When a modified snoop response from an L1 cache of a second processor is detected, a store type operation associated with the second processor is queued and forwarded to an arbiter. The store type operation is linked to the first processor load operation when the store type operation is selected and initiated by the arbiter. The data portion of the store type operation satisfies the first processor load operation when the store type operation completes. The step of linking the store type operation and the load operation preferably comprises validating the load operation in a first stage of the load miss block's pipeline when the store type operation is initiated. The store type operation preferably reloads a lower level cache with the data in the modified entry of the L1 cache of the second processor and the load operation is preferably satisfied as the lower level cache is reloaded.

A fifth embodiment of the invention emphasizing data source arbitration contemplates a multiprocessor system that includes a set of processors connected to a memory subsystem via a local interconnect. The memory subsystem includes a load miss block adapted for queuing load type operations, a store miss block adapted for queuing store type operations, an arbiter configured to receive and arbitrate queued operations from the load and store miss blocks as well as operations directly from the set of processors, and means for reloading an L1 cache. The means for reloading the L1 cache reload the cache with data from a first data source via a reload data bus upon completion of a first operation arbitrated through the arbiter and means for reloading the L1 cache with data from a second data source via the reload data bus upon completion of a second operation arbitrated through the arbiter. In this manner, operations requiring a reload of L1 cache are arbitrated through a common arbiter regardless of the source of data required to complete the load request. Moreover, the data is reloaded via a common data bus regardless of the source of data thereby eliminating backend data arbitration. Preferably, the means for reloading the L1 cache are connected to an L2 cache and configured to reload the L2 cache with the reload data while the L1 cache is being reloaded such that the L2 data reload is synchronized with the L1 data reload. The source of data may be another L1 cache associated with the set of processors or a bus interface unit adapted for retrieving data from a system bus. In the preferred embodiment, the local interconnect comprises a unidirectional address bus connecting the set of processors to the memory subsystem. In one embodiment, the memory subsystem includes a memory subsystem pipeline connected to the output of the arbiter wherein an arbitrated operation completes when it reaches the last stage of the pipeline.

The fifth embodiment of the invention further contemplates a method of reloading an L1 cache in a multiprocessor device. A first operation that requires data from a first data source and a second operation that requires data from a second data source are forwarded to an arbiter. In response to the first operation being selected and initiated by the arbiter, the first operation is completed and the L1 cache reloaded from the first data source via a reload data bus. In response to the second operation being selected and initiated by the arbiter, the second operation is completed and the L1 cache reloaded with the data from the second data source via the data bus. Preferably, completing the first and second operations includes forwarding the operations to a memory subsystem pipeline where the first operation is completed and the reloading of the L1 cache occurs when the first operation reaches the last stage of the pipeline. The method may further include reloading an L2 cache with the reload data when the reload data completes such that the reload of the L1 cache and the reload of the L2 cache occurs concurrently.

A sixth embodiment of the invention emphasizing managing the ordering of multiple pending bus or global interventions (i.e., cache-to-cache transfers that traverse the system bus) contemplates a computer system including a first multiprocessor system connected to a system bus and adapted to forward first and second load requests to the system bus where the first load request precedes the second load request. The system further includes a second multiprocessor system connected to the system bus. The second multiprocessor system includes a memory subsystem comprised of first and second cache levels arranged such that an operation that retrieves data from the first cache level is arbitrated through the second cache level before the data becomes available to the system bus (i.e., the first cache level is a higher cache level than the second cache level). A snoop control state machine of the second multiprocessor system is adapted to stall arbitration of a second operation initiated in the second cache level responsive to the second load request until a first operation initiated in the first cache level responsive to the first load request has been arbitrated through the second cache level. In other words, new operations to a lower cache level are stalled until older operations pass the common arbitration point. Preferably, the first cache level includes a first operation queue for storing operations awaiting arbitration in the first cache level. Operations arbitrated in the first cache level are routed to a second store queue. In one embodiment, the memory subsystem further includes a second arbiter and a third cache level. In this embodiment, operations are stored in the second store queue pending arbitration in a second arbiter. In one embodiment, a first external snoop associated with the first load request hits to a modified cache line in the first cache and a second external snoop associated with the second load request hits to a modified cache line in the second cache level. The second multiprocessor is preferably adapted to send a data ready signal to the first multiprocessor when data associated with the first load request is available for transmission over the system bus. In the preferred embodiment, the data ready signal conveys no address information. The system is preferably configured to transfer the data associated with the first load request with a data-only bus transaction following the data ready signal.

The sixth embodiment of the invention further contemplates a method of managing interventions in a computer system. A first load request is initiated and forwarded to a system bus. A second load request is initiated after the first load request and forwarded to the system bus. The first operation generates a first operation in a first cache level of a multiprocessor and the second operation generates a second operation in the second cache level of the multiprocessor where the first cache level is higher than the second cache level. The second operation is stalled until the first operation arbitrates through the second cache level. The method preferably further includes generating a data ready signal when the data associated with the first load request is available to the system bus and transferring the data associated with the first load request via the system bus using a data only bus transaction.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Figure 1:
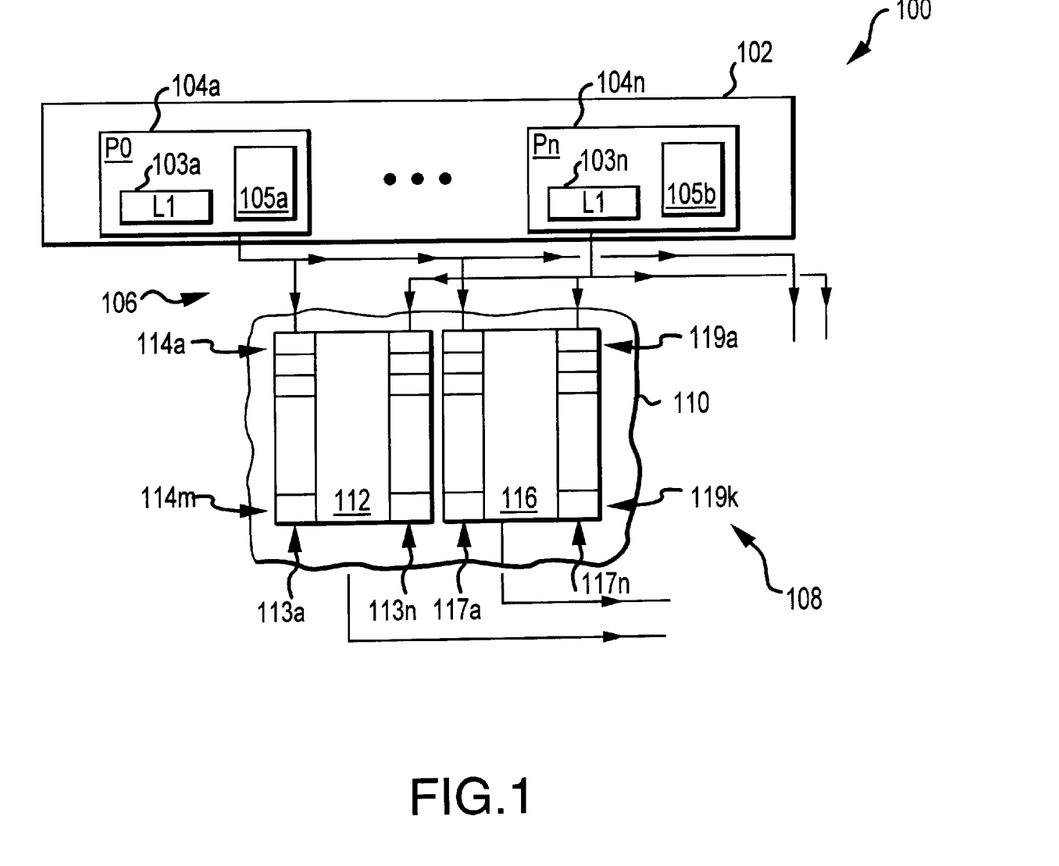
FIG. 1 is a simplified block diagram of a computer system according to the present invention including matched processor and operating block load and store queues preventing additional operations from issuing when a the processor queue reaches its capacity.

Turning now to the drawings, FIG. 1 is a simplified block diagram of a first embodiment of a computer system 100 emphasizing a resource management feature for reducing retries. Computer system 100 includes a multiprocessor 102 and a memory subsystem 108. Multiprocessor 102 includes a set of processors 104a . . . 104n (collectively referred as processors 104 or set of processors 104). In the preferred embodiment, each processor 104 includes its own respective level one (L1 ) cache memory 103 as will be familiar to those skilled in the design of microprocessor based computer design. Each L1 cache 103 provides a relatively small, but extremely fast memory component to its corresponding processor 104. Each processor 104 further includes an execution unit (not shown) for issuing and completing processors operations. Processor operations typically include either loading (reading) data from memory or storing (writing) data to memory. If the data required for a particular processor operation is not available in its level one cache, processor 104 must obtain the data via memory subsystem 108. Memory subsystem 108 includes logic and interfacing to provide data required by processors 104 in an efficient manner as discussed in detail below.

In one embodiment of the present invention, multiprocessor 102 and memory subsystem 108 are packaged as a single device and are preferably fabricated on a monolithic semiconductor substrate such as silicon. Incorporating the set of processors 104 of multiprocessor 102 and memory subsystem 108 into a single device advantageously frees the system designer from pin count constraints of conventionally designed multiprocessor systems (i.e., multiprocessor systems in which each processor is packaged separately). Typically, for example, shared or bi-directional data and address buses are used to couple the memory subsystem to the processors of a conventionally designed multiprocessor system to control the number of interconnects and device pins required. The presently preferred embodiment of the invention contemplates a multiprocessor 102 and subsystem 108 that are coupled via a local interconnect 106. In the preferred embodiment, interconnect 106 is comprised of unidirectional data and address busses that improve performance by eliminating the need for buffers and tri-state drivers typically associated with bidirectional busses. Because of the single package configuration, the extra signals required to implement unidirectional busses does not result in increased device pin counts.

As shown in FIG. 1, memory subsystem 108 includes an operation block 110. Operation block 110 is connected to the set of processors 104 via interconnect 106. Operation block 110 is adapted to receive and queue operations issued by the set of processors 104 and operations generated by the control logic (not explicitly indicated) of memory subsystem 108. In one embodiment, operation block 110 includes a store miss block 112 and a load miss block 116. Load miss block 116 is preferably adapted for storing operations that require data returned to one or more of the processors 104. In addition, load miss block 116 may store operations that attempt to gain ownership of a cache line within one or more of the L1 caches 103. Examples of such operations include touches, prefetches, instruction fetches, writeback stores and any other operations generated by instructions that attempt to get ownership of a line. Store miss block 112, in the preferred embodiment, is suitably adapted for queuing operations that are not suitable for queuing in load miss block 116. Examples of operations that might be queued in store miss block 112 include write-through and cache inhibited store operations, L1 castouts, local intervention address operations, and some cache control operations, synchronizing operations and memory management operations. In one embodiment, the components of operation block 110 are organized into a set of queues, wherein each queue has an specified number of queue entries. In the depicted embodiment in which operation block 110 includes a store miss block 112 and a load miss block 116, each block includes its own set of queues and entries. More specifically, store block 112 of operation block 110 includes multiple queues 113. Each queue 113 is designed with multiple entries 114 for queuing up issued operations. In the presently preferred embodiment, each processor 104 of multiprocessor 102 is associated with and connected to its own dedicated store miss block queue 113 via interconnect 106. Each store miss block queue 113 includes a specified number of queue entries 114. Similarly, the preferred embodiment includes a load miss block 116 that includes a dedicated queue 117 for each processor 104 of multiprocessor 102. Each queue 117 of load miss block 116 has a specified number of entries 119.

The performance of computer system 100 as shown in FIG. 1 is improved by features that eliminate the need for handshaking protocols associated with conventionally designed, shared bus systems. Shared bus systems, typically require a bus agent seeking control of the bus to request the shared bus from an arbiter, wait for the arbiter to grant (or deny) the bus to the requester, and assert control of the bus. It will be appreciated that the handshaking protocol associated with conventional bidirectional shared bus systems prevents or complicates the ability to pipeline memory subsystem operations. Pipelining of L1 load misses and other transactions that require the use of memory subsystem 108 is extremely important for high performance superscalar microprocessor systems. With a handshaking protocol, memory subsystem 108 requests past the L1 cache may not be readily pipelined. The requesting and granting of the shared bus in a handshaking protocol could not typically be accomplished in a single cycle if there is any considerable distance between the processor and the arbiter. Accordingly, a typical sequence with handshaking protocols required of shared bus implementations would include one cycle for driving a request and performing the arbitration, one cycle for driving back a grant, and another cycle for driving the address. The embodiment of the present invention depicted in FIG. 1 facilitates true pipelining of memory subsystem operations by utilizing unidirectional busses to communicate operations, addresses, and data between multiprocessor 102 and memory subsystem 108. Another common characteristic of conventionally designed multiprocessor systems is the need to retry operations. Operations must be retried when they cannot be executed or queued in a memory subsystem resource.

The embodiment of the present invention depicted in FIG. 1 eliminates the complexity inherent in retry logic and retry protocols by incorporating a processor queue unit 105 into each of the processors 104. In the preferred embodiment, each processor queue unit 105 includes a load miss queue and a store miss queue (not depicted). Each queue in processor queue unit 105 corresponds to a queue in operation block 110. For example, processor queue unit 105a of a processor 104a preferably includes a store queue that corresponds to store queue 113a in store miss block 112 and a load queue that corresponds to load queue 117a of load miss block 116. The depths of the queues in processor queue unit 105 are preferably matched to the depths of their corresponding queues in operation block 110. Moreover, for each entry in processor queue unit 105, there is a corresponding entry in operation block 110. Thus, if load queue 117a of load miss block 116 contains X valid operations and Y available entries, the load queue of processor queue unit 105a will also include X valid operations and Y available entries. In addition to status information, the queue entries could further include operation address information to facilitate a design in which it is unnecessary to return address information to multiprocessor 102 from memory subsystem 108. In this embodiment, the address information in a queue entry of operation block 110 would correspond to address information in the corresponding entry of a queue in the appropriate processor queue unit 105. In the preferred embodiment, each processor 104 is configured to detect the lack of an available entry in its own queue unit 105 by detecting valid status information in each queue entry. The lack of an available entry in processor queue unit 105 inhibits processor 104 from issuing additional operations until one or more entries in processor queue unit 105 becomes available, such as when a pending operation is completed or invalidated. Because the queues in each queue unit 105 match the depths of corresponding queues in store miss block 112 and load miss block 116, the microarchitecture of system 100 as depicted in FIG. 1 guarantees that an entry is available in the appropriate queue of operation block 110 if an entry is available in processor queue unit 105. This guaranteed availability of an appropriate queue resource for each processor issued operation allows the elimination of retry logic needed to handle operations that lack sufficient queue resources. In this manner, the design further facilitates the ability of multiprocessor 102 to pipeline operations bound for memory subsystem 108 and to simplify the micro-architecture of the system.

Figure 2:
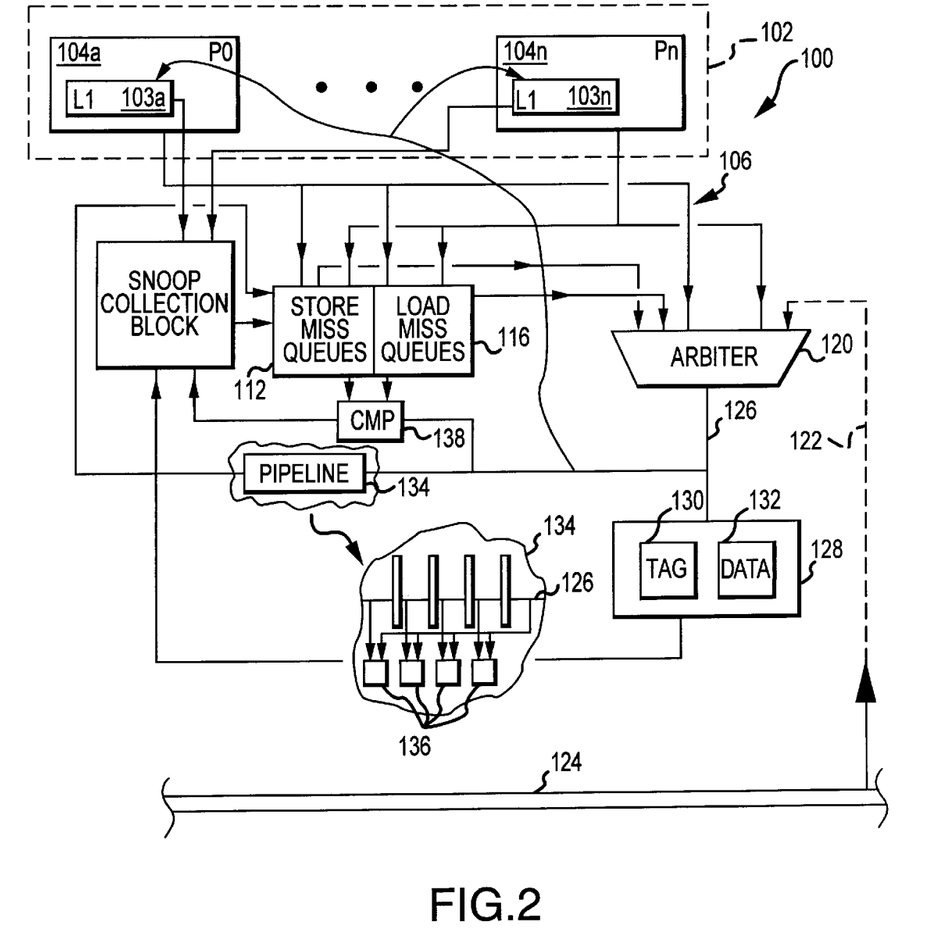
FIG. 2 is a simplified block diagram of a computer system according to the present invention including a single point of arbitration for external and internal snoop operations.
Figure 3:
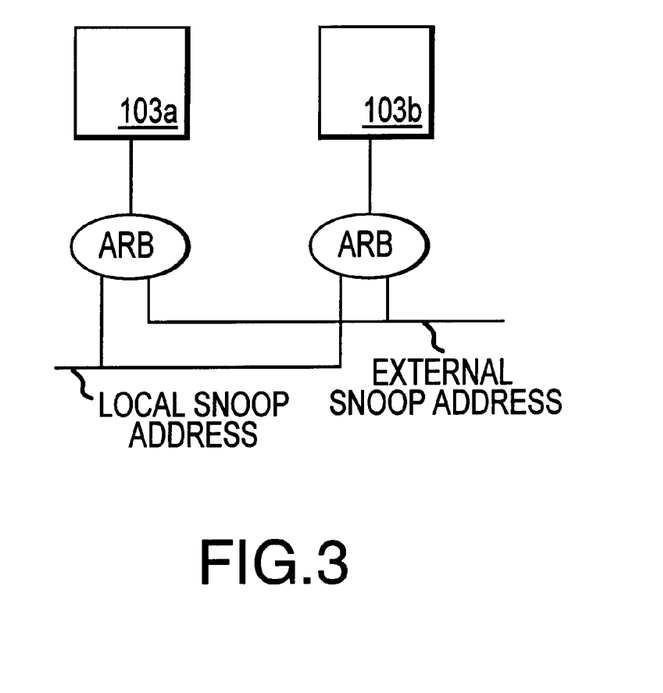
FIG. 3 is a block diagram of a distributed arbitration alternative to the single point arbitration of FIG. 2.
Figure 4:
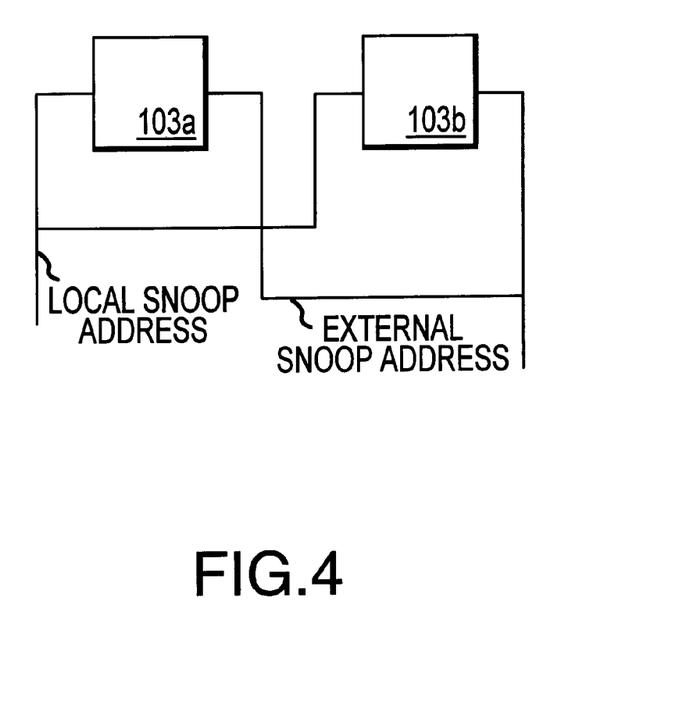
FIG. 4 is a block diagram of a dual ported coherency unit alternative to the single point arbitration of FIG. 2.

Turning now to FIG. 2, a simplified block diagram of an embodiment of computer system 100 emphasizing an efficient coherency maintenance scheme is presented. In this embodiment, memory subsystem 108 includes an operation block 110 preferably comprised of a load miss block 116 and a store miss block 112 substantially as discussed previously with respect to FIG. 1. Load miss block 116 and store miss block 112 are connected to multiple processors 104 of a multiprocessor 102 via a local interconnect 106. Again as discussed previously, the preferred embodiment of local interconnect 106 includes a unidirectional address bus from multiprocessor 102 to memory subsystem 108, which are both preferably integrated into a single device package. (For the sake of clarity, the return address path from memory subsystem 108 to multiprocessor 102 is not indicated in FIG. 1). Load miss block 116 is suitable for queuing up operations requiring a return of data such as load operations that miss in the L1 cache 103 of the issuing processor 104 while store miss block 112 is adapted to queue operations not suitable for load miss block 116. The embodiment of memory subsystem 108 as depicted in FIG. 2 further includes an arbiter 120. Arbiter 120 receives queued operations from store miss block 112 and load miss block 116. In one embodiment of memory subsystem 108, arbiter 120 may receive, in addition to queued operations from operation block 110, operations directly from the set of processors 104. By providing a direct path from processors 104 to arbiter 120, the invention enables the possibility of a "bypass" arbitration in which an operation may be initiated immediately (i.e., in the next cycle) after being issued by the appropriate processor 104. In the preferred embodiment, arbiter 120 is suitably enabled to receive external snoop operations 122 from a system bus 124. External snoop operations include addresses of operations originating from a resource not local to multiprocessor 102. To insure memory coherency, operations initiated from these non-local resources must be snooped by the coherency units of multiprocessor 102 and memory subsystem 108. (For purposes of this disclosure, a coherency unit is any resource, node, net, register, pipeline stage, etc., that might contain a coherent address.) Turning momentarily to FIGS. 3 and 4, alternative coherency arrangements are depicted to provide a point of reference. In FIG. 3, a distributed arbitration scheme is presented in which externally and internally generated snoop addresses are arbitrated at each point of coherency. FIG. 3 depicts a pair of first level caches 103a and 103b. Each cache 103 is associated with a coherency arbiter. Each coherency arbiter receives the external snoop address and an internal snoop address and forwards the arbitrated address to the appropriate coherency unit. The distributed arbitration scheme of FIG. 3 introduces complexity in the form of an increased number of arbiter circuits. Moreover, each of the snoop address busses must be routed to each of the arbiters potentially resulting in a great deal of complex interconnects, which must typically be routed through an extremely dense interconnect network. In addition, the distributed arbitration scheme must insure that each arbiter produces the same result and this may introduce difficult timing considerations into memory subsystem 108. FIG. 4 presents an alternative scheme in which each coherency unit is dual ported. In this scheme, the external and internal snoop address are routed directly into separate snoop ports of the coherency unit where the separate address are simultaneously snooped. Adding an extra port to every coherency unit in a multiple processor chip is not typically an optimal solution for managing external and local snooping. The extra ports increases both the area consumed by the design and, more significantly, the design cycle.

Returning now to FIG. 2, the single arbiter 120 is adapted to select and initiate (i.e., arbitrate) one of the operations received by arbiter 120 and forward the selected operation to an output 126 of arbiter 120. The arbitration method employed by arbiter 120 is implementation specific and the invention as described herein is not intended to limit arbiter 120 to any specific arbitration methodology. Preferably, a fairness algorithm such as a round robin arbitration is used. The address associated with the selected operation at output 126 serves as the single coherency address for all coherency units in multiprocessor 102 and memory subsystem 108. More specifically, the output 126 is forwarded to the snoop ports of each L1 cache 103 of multiprocessor 102. In addition, the single snoop address is forwarded to lower level cache such as L2 cache 128. In the depicted embodiment, lower level cache layer 128 is shared by each processor 104 of multiprocessor 102. L2 cache 128 includes a tag array 130 and a data array 132 as will be familiar to those skilled in cache memory designs. In one embodiment of the present invention in which the operations selected by arbiter 120 are forwarded to a memory subsystem pipeline 134 as discussed further below, each stage of pipeline 134 may include a coherent address and, accordingly, each stage of pipeline 134 is configured with a comparator 136 (shown in the inset of FIG. 2) for comparing the address at each pipeline stage with the single snoop address present at output 126 of arbiter 120. An additional comparator block 138 is shown coupled to store miss block 112 and load miss block 116. Comparator block 138 is configured to receive the single snoop address from output 126 and compare and it to each of valid queued operation in operation block 110. Each of the points of coherency in FIG. 2 produces a coherency response or snoop response when presented with the single snoop address. A snoop collection block 140 collects each of the coherency responses and makes appropriate modifications to the operations stored in operation block 110. In a relatively simple case, as an example, snoop collection block 140 may simply require the operation selected by arbiter 126 to be retried if any of the snoop responses from any of the coherency units comes back with other than a clean response. Such a mechanism would simplify coherency by effectively serializing all operations affecting a common coherency block (i.e., cache line). It will be appreciated that the details of snoop collection block 140 logic and the handling of specific response is implementation specific and the present invention is not intended to imply or require any specific implementation or cache handling mechanism. Those skilled in computer design will appreciate, nevertheless, that the embodiment of invention depicted in FIG. 2 enables an efficient method of receiving an external snoop operation and one or more internal operations. The external operation and the internal operation are arbitrated a single point of arbitration at the "front end" of memory subsystem 108 such that the separate snoop address busses are not required to be routed to each coherency unit. The address associated with the operation that wins the arbitration becomes the single snoop address that is broadcast to each coherency unit in the memory subsystem 108 and the multiprocessor 102 to produce a set of snoop responses that are collected at a snoop collection block that can take action with respect to any pending or queued operation in response to the snoop responses.

Figure 5:
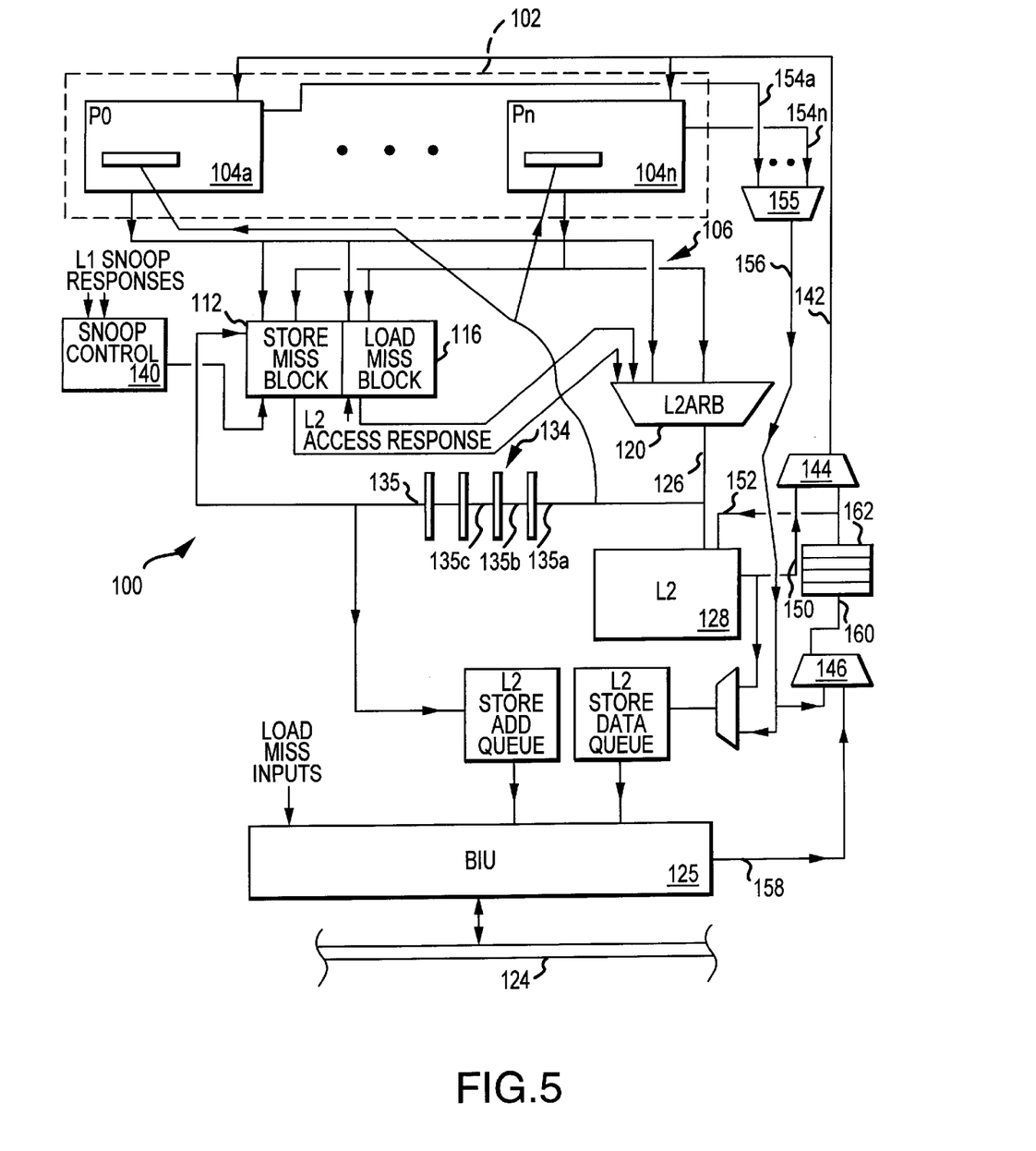
FIG. 5 is a simplified block diagram of a computer system according to the present invention including a unified operation pipeline.

Turning now to FIG. 5, an embodiment of computer system 100 is depicted emphasizing various additional features of the invention. The embodiment, depicted in FIG. 5 includes many features of the embodiments depicted and discussed previously with respect to FIGS. 1 and 2 including multiprocessor 102, local interconnect 106, store miss block 112, load miss block 116, arbiter 120, L2 cache 128, and snoop control block 140 all essentially as discussed previously. As depicted in FIG. 5 and illustrated with respect to the timing diagrams of FIGS. 6, 7, and 8, the microarchitecture of computer system 100 and memory subsystem 108 is predicated on the presence of a unified memory subsystem pipeline 134 in which the depth of pipeline 134 is a function of the time required to obtain snoop responses from all coherency units in subsystem 108 and multiprocessor 102 and the access time associated with lower cache levels such as L2 cache 128. In other words, the depth of the pipeline is sufficient to allow an operation that enters the pipeline at a first stage (where snooping and L2 cache access are initiated) to exit just as the L2 access and snoop response are known. In this fashion, the memory system pipeline maximizes throughput by matching the number of pipeline stages to the number of cycles required to gather the information necessary to complete the operation (or take additional action depending upon the actual snoop responses received). Store miss block 112 and load miss block 116 each include their own control pipelines (not shown) that track memory subsystem pipeline 134 such that an operation flowing through the load miss block is valid at the same stages that the operation's address is valid in pipeline 134. Each control block pipeline stage includes state information that indicates whether the corresponding stage of the pipeline currently holds a valid operation. Thus, FIG. 5 depicts memory subsystem pipeline 134 comprised of a set of pipeline stages 135*a* . . . 135*n* (collectively referred to as pipelines stages 135). First pipeline stage 135*a* is coupled to output 126 of arbiter 120. As discussed above, output 126 carries the operation that won the most recent arbitration from arbiter 120. The address of the operation on output 126 is broadcast to the coherency units of memory subsystem 108 and multiprocessor 102 as the operation enters first stage 135*a* of memory subsystem pipeline 134. As the memory subsystem operation proceeds through each stage 135 of pipeline 134, first pipeline stage 135*a* becomes available for a new memory subsystem operation. While the operation is proceeding through the pipeline, snooping and L2 cache accessing associated with the operation are proceeding. When the operation exits the pipeline at stage 135*n*, the results of the snooping and L2 cache access have been routed to snoop control block 140 and load miss block 116 respectively. At that time, control logic of memory subsystem 108 can determine whether to complete the operation, request data from the bus interface unit, initiate action responsive to a particular snoop response, or retry the operation.

Figure 6:
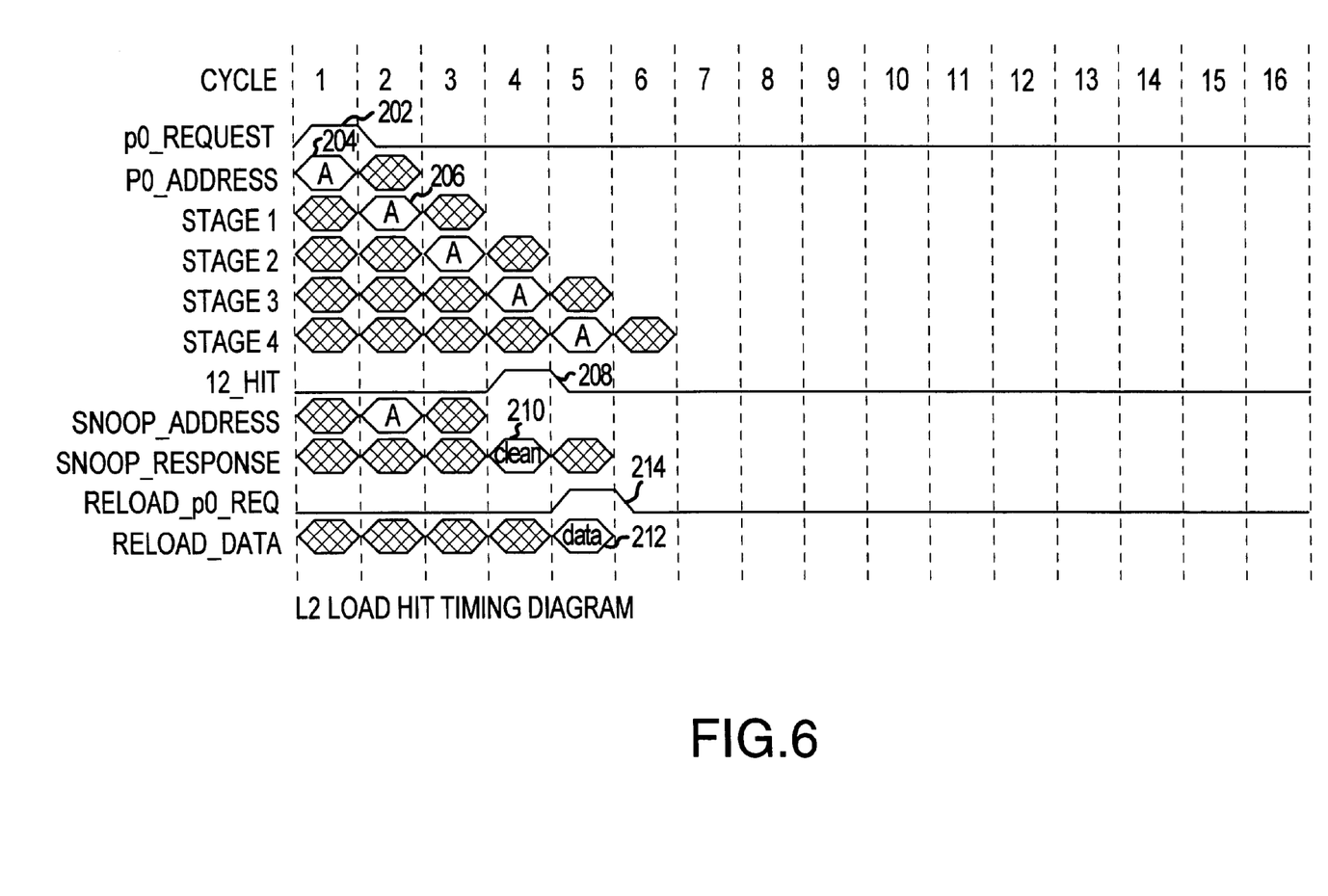
FIG. 6 is a timing diagram illustrating operation of a load operation according to the present invention.

Referring to the timing diagram of FIG. 6 for illustrative purposes, the activity of pipeline 134 is shown for a typical memory subsystem operation in which a load operation that misses in an L1 cache results in an L2 hit. In cycle 1, a first processor 104*a* issues a load operation that misses in the L1 cache 103*a* corresponding to first processor 104*a*. First processor 104*a* sends an appropriate load request indicated by reference numeral 202 to memory subsystem 108 via local interconnect 106 along with the appropriate load address associated with the load miss operation as indicated by reference numeral 204. The load miss operation is simultaneously forwarded to the load miss block 116, where it is preferably queued in a queue 117*a* (shown in FIG. 1) dedicated to first processor 104*a*, and to arbiter 120 where the load miss operation is arbitrated against operations from the remaining processors 104 of multiprocessor 102 as well as against queued operations from load miss block 116 and store miss block 112 (and against external snoop operations not shown in the representation of FIG. 6). In this hypothetical example, the load miss operation under consideration wins the bypass arbitration and is forwarded to output 126 of arbiter 120 where its address is broadcast to the coherency units of memory subsystem 108 and multiprocessor 102 and an access to L2 cache 128 is initiated as the load miss operation enters first stage 135a of pipeline 134 (as indicated by reference numeral 206). In the example shown in the timing diagram of FIG. 6, it is assumed that the snoop access time is two cycles and the L2 access time is three cycles. In cycles 2 and 3, the snoop and L2 access continues as the load miss operation proceeds through the pipeline. In cycle 4, the L2 hit response and the snoop response from the processors are known as indicated by reference numerals 208 and 210 respectively. In cycle 5, the data from L2 128 is available as indicated by reference numeral 212 and a first processor reload request 214 is issued. The data 212 is available at output bus 150 of L2 cache 128 and the reload request gates L2 data out bus 150 to a single data in bus 142 for multiprocessor 102 where the data is routed to first processor 104a and reloaded in L1 cache 103a.

Figure 7:
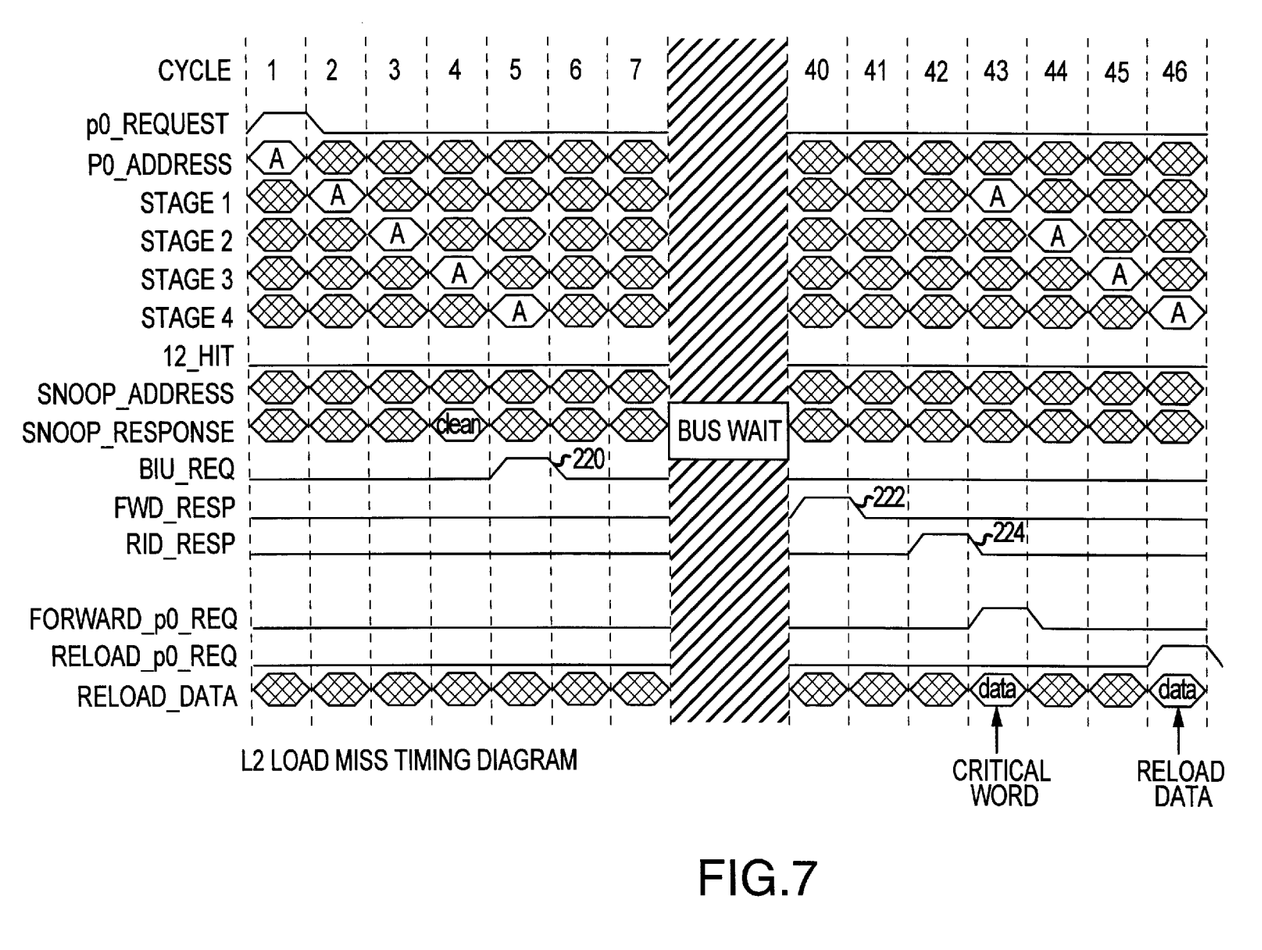
FIG. 7 is a timing diagram illustrating operation, according to the present invention, of a load operation that requires a data fetch via a system bus.

The timing diagram of FIG. 7 depicts the operation of memory subsystem 108 when the memory subsystem is forced to retrieve data from memory via external bus 124. Cycles 1–3 of FIG. 7 are identical to the corresponding cycles of the timing diagram of FIG. 6. A processor initiated load operation misses in its L1 cache and prompts a load request that is arbitrated and forwarded to memory subsystem pipeline 134. Local snooping and L2 access are initiated as in FIG. 6. In the case depicted in FIG. 7 however, the L2 cache responds with a miss (indicated by the lack of a hit response in cycle 4. Assuming that there is no lower level cache memory between the L2 cache and the bus interface unit 125, the L2 miss (coupled with the clean response received from all of the coherency units) means that the data required to complete the processor initiated load operation is not currently available in any resource of memory subsystem 108 or multiprocessor 102. In other words, the data required for the load operation is not available locally and must be fetched from memory (or from some other system resource) via bus interface unit 125 and system bus 124. In response to the L2 miss signal, a BIU request signal is initiated in cycle 5. Note that, because the load operation had propagated through pipeline 134, the address associated with the load operation is available to bus interface unit 125 at the same time as the bus interface request indicated by reference numeral 220. The BIU request must arbitrate to obtain mastership of the system bus 124. In addition, the access time to fetch data from a system memory may be significant. The total required time to obtain ownership of the system bus 124 and to retrieve the data is represented in FIG. 7 by bus wait state indicated between cycles 7 and 40. (It should be noted that cycle 40 has been arbitrarily chosen and is not intended to imply any specific bus wait duration or any specific system memory access time). The time required to fetch data from memory via system bus 124 may depend on many factors. In any event, after some undetermined wait, a first portion of the fetched data arrives at the bus interface unit. Typically, a processor load operation requires only 4 or 8 bytes of data (depending upon the width of the data bus employed) whereas the typical unit of coherency within the cache memories of multiprocessor 102 is significantly longer. In view of the comparatively slow access to memory denoted by the bus wait indicated in FIG. 7, it is common practice to retrieve not only the specific data required to complete the load operation that initiated the data fetch, but to also retrieve enough of the memory adjacent to the desired data to fill a cache line. This practice produces an unfortunate result in which the data required to complete the load operation (referred to as the critical data) may have to wait for the rest of the data comprising the corresponding cache line. Because the width of the data bus of system bus 124 is typically narrower than the size of the cache line, and because the system bus cycle time is relatively long compared to the cycle time of memory subsystem 108, the number of cycles required to retrieve an entire cache line via system bus 124 may be considerable. To address this problem, it is common practice to insure that the critical data arrives at the bus interface unit ahead of the rest of the fetched data. In conventional systems, however, the arrival of the critical data typically results the initiation of an operation that can obtain ownership of a shared data bus, possibly necessitating the system to invalidate a pending operation to enable the critical data to proceed. The present invention as depicted in FIG. 7 emphasizes a technique in which the critical word forwarding operation is achieved without a disruption of pending operations.

When the critical data arrives at bus interface unit 125 via system bus 124, bus interface unit 124 sends a signal (indicated by reference numeral 222) to load miss block 116. In response to signal 222, load miss block 116 determines if its control pipeline stage 1 is currently valid with a load type request. If the first stage is not valid with a load type request, the forwarding operation is initiated and validated in the first stage of load miss block 116. By the time the forwarding operation has propagated through the pipeline in the same fashion as all other memory subsystem operations, the critical data at bus interface unit is routed via bus 158 to the single data input bus 142 of multiprocessor 102. In the preferred embodiment, control logic recognizes that the forwarding operation requires data to be sent from bus interface unit 125 to an L1 cache 103 and appropriately gates muxes 146 and 144 to form the required data path from bus interface unit 125 to L1 cache 103a. If the load miss block 116 determines that its pipeline stage 1 is valid, then the forwarding operation is retried again in the next cycle. In this manner, the forwarding operation is introduced into the memory subsystem pipeline 134 at the earliest opportunity without displacing, invalidating, or otherwise disrupting valid operations. Eventually, the entire cache line (or other coherency granule) arrives at and is made available to the bus interface unit 125. The bus interface unit signals the load miss block that the cache line has arrived with a reload signal 224. The load miss unit then generates a reload operation that is arbitrated at arbiter 120 as any other memory subsystem operation. In the case depicted in FIG. 7, the reload request wins the arbitration and the address is forwarded to first stage 135a of pipeline 134. The reload operation is then allowed to complete and the entire line of cache 103 is reloaded via the single data bus 142 and stored or consumed in L2 cache 128. Those skilled in the field will appreciate the efficient use of pipeline bandwidth evidenced by initiating the forwarding operation as a background task that does not interfere with pending tasks. Only if and when the memory subsystem 108 detects a hole or opening in the load miss pipeline does the forwarding operation take place.

Figure 8:
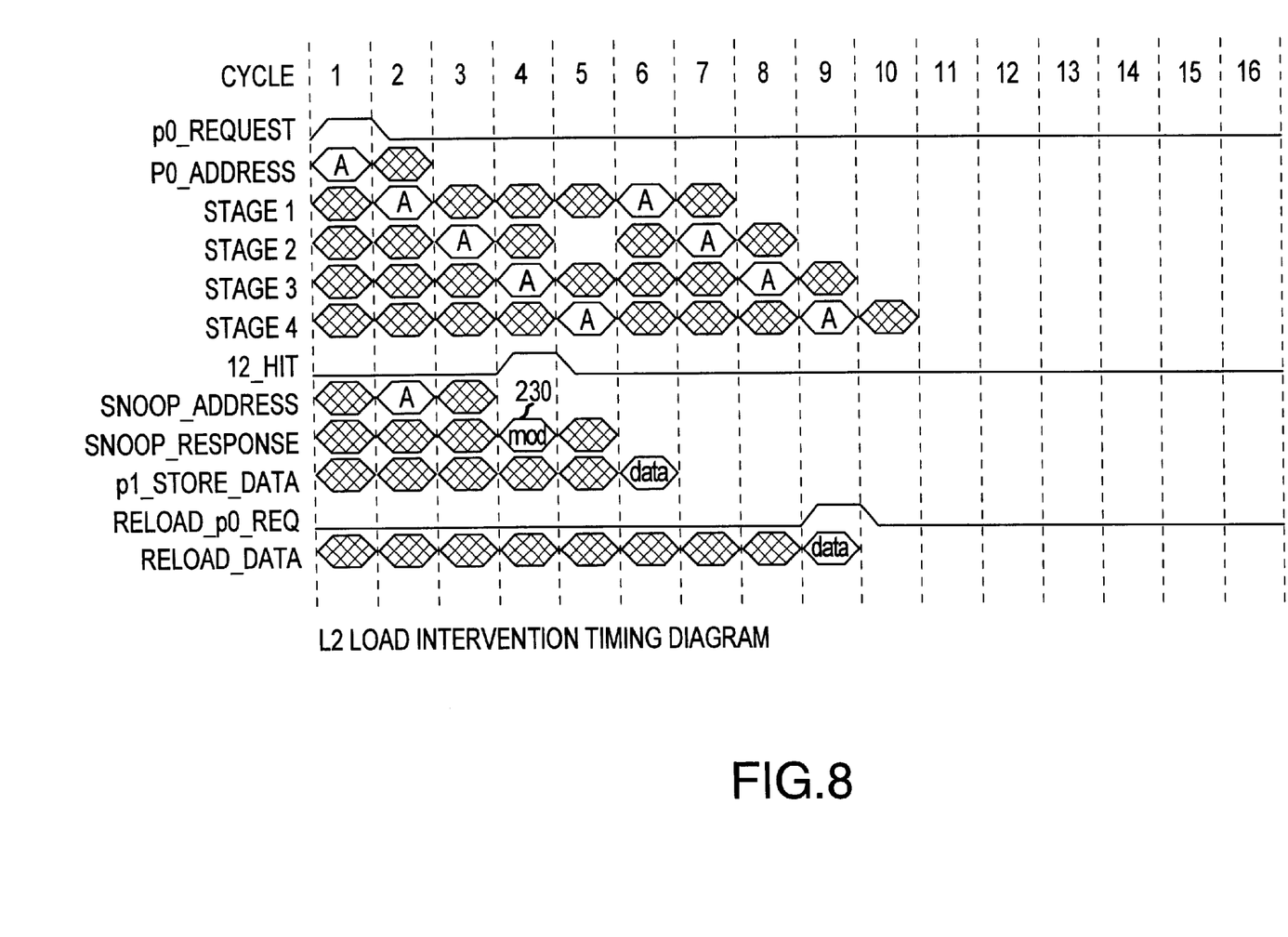
FIG. 8 is a timing diagram illustrating operation, according to the present invention, of a local intervention operation.

Turning now to the timing diagram of FIG. 8, a feature of the invention emphasizing an efficient manner of managing local cache-to-cache transfers (referred to in this disclosure as local interventions) is illustrated. A local intervention is initiated when a load request from a first processor 104a generates a modified snoop response from one of the other processors (processor 104n in this example). When this condition occurs, both the L1 cache 103a of first processor 104a and the L2 cache 128 are lacking the data in the modified line of the L1 cache 103n of processor 104n. The present invention contemplates a method of reloading L2 cache 128 and L1 cache 103a with a single arbitration. Referring to FIG. 8, first processor 104a initiates a load request in cycle 1 in response to a load operation that missed in first cache 103a. The load request is forwarded to arbiter 120 (as well as to load miss block 116) where, in the illustrated example, the load arbitration wins the arbitration. The address associated with the load operation is forwarded to output 126 where the address is sent to the tag array of L2 cache 128 and broadcast to all coherency units in memory subsystem 108 and multiprocessor 102. In addition, the operation is routed to memory subsystem pipeline 134, all as discussed previously with respect to the timing diagram of FIGS. 6 and 7. Unlike the previous examples, however, the load operation address illustrated in FIG. 8 produces a modified snoop response in cycle 4 as indicated by reference numeral 230. The modified snoop response 230 indicates that the most recent copy of the data associated with the load operation address currently resides in the L1 cache 103 of the processor 104 that responds with the modified snoop response. Thus, regardless of whether L2 cache 128 responds with a cache hit or cache miss in cycle 4, a store type operation referred to herein as a local intervention operation is initiated to write the modified data back to L2 cache 128. Snoop control block 140, in response to detecting the modified snoop response, queues up a local intervention operation in store miss block 112. The local intervention operation is eventually arbitrated through arbiter 120 and proceeds through memory subsystem pipeline 134 in the manner discussed previously. When the local intervention wins the arbitration and is forwarded to first stage 135a of pipeline 134, store miss block 112 informs load miss block 116 that the local intervention operation is valid in first stage 135a of pipeline 134. In response, load miss block 116 validates the first stage of its control pipeline thereby effectively creating a load operation in load miss block 116 that is linked to or associated with the local intervention operation proceeding through store miss block 112. In this manner, load miss block 116 and store miss block 112 each reflect a valid operation in their respective control pipeline's first stage. The common address associated with the two operations propagates through memory subsystem pipeline 134. When the intervention operation (as well as the subsystem initiated load operation) reaches the last stage 135n of pipeline 134, (also referred as the data stage to emphasize that data is ready when the operation reaches this stage), the appropriate data is routed from the L1 cache 103n of the second processor 104n via data bus 154n, through muxes 155 and 146, which are controlled by subsystem logic (not specifically indicated) to data bus 160. The data then proceeds through staging circuitry 162, mux 144 and back to L1 cache 103a of first processor 104a thereby satisfying the first processor load operation that initiated the intervention operation initially. Moreover, the data on bus 152 is routed to L2 cache 128 where the data is consumed. In this fashion, the reload of L1 cache 103a and L2 cache 128 are achieved essentially simultaneously while requiring only a single arbitration through arbiter 120. Once the local intervention wins the arbitration of arbiter 120 and links up a corresponding operation in the load miss queue 116, no additional arbitration is required to complete the reload of the first level cache 103a.

The discussions presented above with respect to the critical word forwarding feature illustrated in the timing diagram of FIG. 7 and the local intervention illustrated in the timing diagram of FIG. 8 both take advantage of an additional feature of the present invention. Those skilled in the art will appreciate that the architecture of memory subsystem 108 provides an efficient mechanism for arbitrating the source of data for any operation that results in an L1 cache reload and for returning data to L2 cache 128. Whether the data for a particular L1 reload event is the L1 cache of another processor (i.e., a local intervention), system bus 124 via bus interface unit 125 (i.e. an external memory fetch), or a lower level cache, the corresponding operation is arbitrated through load miss block 116 and arbiter 120 in the same fashion. When the load type operation propagates through pipeline 134 to data stage 135n, data is reloaded into the L1 cache 103 of the appropriate processor 104. Arbitrating all operations that can result in an L1 cache reload through arbiter 120 in the same manner as a reload from L2 cache 128 greatly simplifies the micro-architecture design and eliminates the need to perform a backend data source arbitration. The single data bus 142 routed to each L1 cache 103 of processor set 104 eliminates back end data source arbitration that can complicate the design. Moreover, by connecting L2 cache 128 to the L1 cache reload data via interconnect 152, L2 cache 128 is reloaded with the reload data at the same time as the L1 cache 103 is being reloaded, without regard to the source of the reload data. Thus, the data required to complete a local intervention or an external memory fetch is consumed in L2 cache 128 as the data is reloaded into the appropriate L1 cache.

Figure 9:
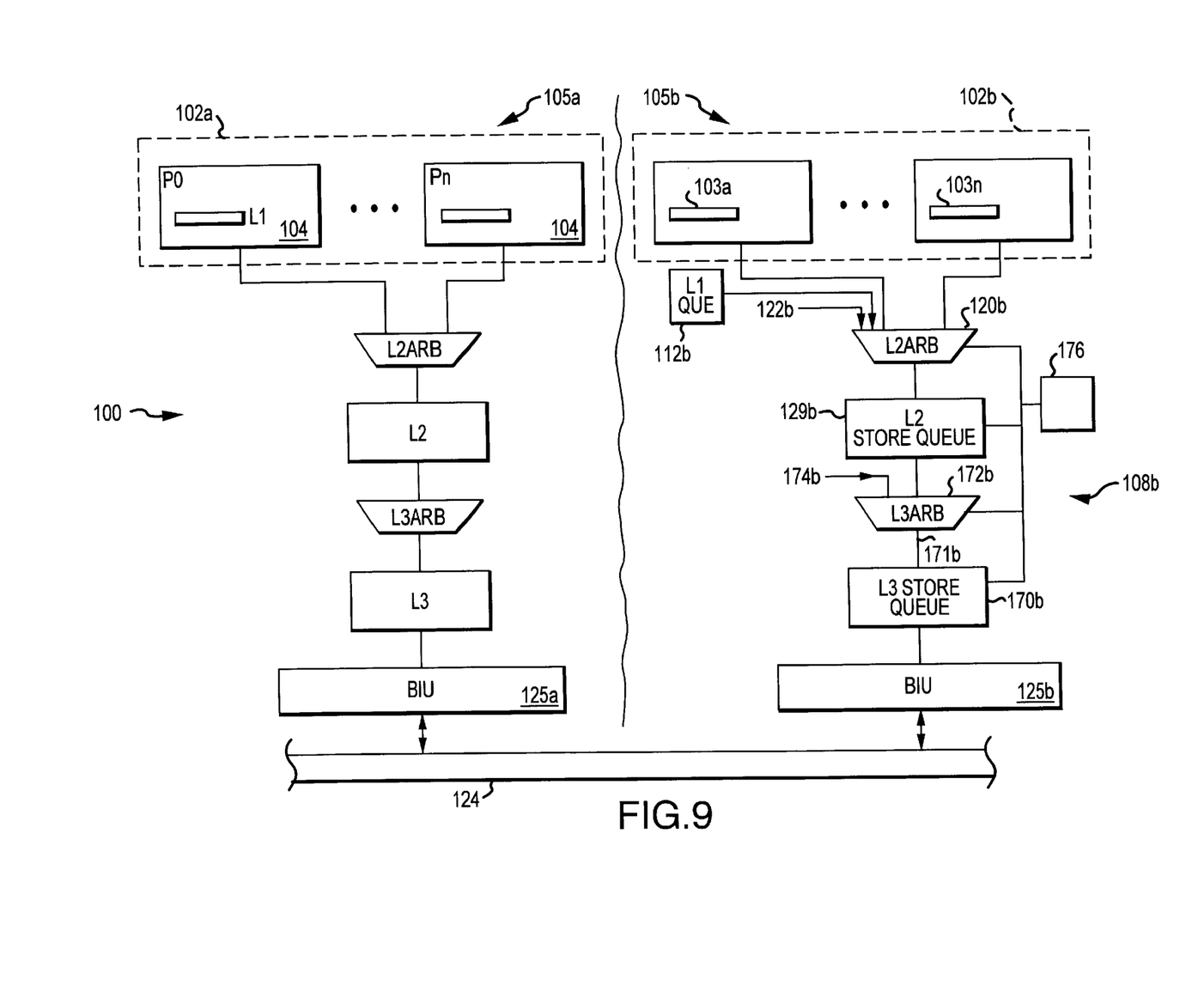
FIG. 9 is a simplified block diagram according to the present invention of a computer system including facilities for maintaining order of multiple pending bus intervention operations.

Turning now to FIG. 9, an embodiment of the present invention emphasizing the ordering of non-local or global interventions is depicted. For purposes of this disclosure a global intervention refers to a sequence in which a load request from a processor 104 of a first multiprocessor 102a on a first "node" 105a goes out to system bus 124 for data, the address of the load request is snooped by a second multiprocessor 102b (as well as by other devices coupled to local bus 124) and the snooped address hits to a modified cache line in either the L1 cache or a lower level cache of the second node 105b. (A node 105, as used herein, refers to a multiprocessor 102 and its associated memory subsystem 108). Computer system 100, according to the embodiment depicted in FIG. 9 contemplates improved performance when a load request from a first node 105a hits to a modified cache line in a second node 105b by providing for a data-only transaction across system bus 124 to satisfy the load request. When the required data is ready to be transported across system bus 124 from second node 105b to first node 105a, second node 105b sends a tagless data ready signal to first node 105a followed by the required data. Unless a bus protocol is implemented preventing multiple pending global interventions, a mechanism of ordering or tagging global interventions is needed to insure the returning data is associated with the appropriate load request. The embodiment of the invention depicted in FIG. 9 addresses this concern with an intervention ordering mechanism that takes advantage of the fact that all operations to a particular level of cache go through a common arbitration point and enter a single pipeline to the next level of cache. More specifically, the depicted embodiment of computer system 100 includes first and second nodes 105a and 105b. Second node 105b comprises a multiprocessor 102b that includes an L1 cache 103 (comprised of the set of L1 caches 103a . . . 103n) and a memory subsystem 108b that includes an L1 store queue 112b, an L2 store queue 129b, and an arbiter 120b that arbitrates L1 level cache operations and forwards arbitrated operations to L2 store queue 129b. The embodiment of computer system 100 and node 105b depicted in FIG. 9 includes three levels of cache. An L3 arbiter 172 arbitrates all L2 level cache operations and forwards arbitrated operations to L3 store queue 170. Although the depicted embodiment discloses L2 and L3 caches, it will be appreciated by those skilled in the field having the benefit of this disclosure that more or less cache levels may be used in a particular implementation. Arbiters 120b and 172b are configured to receive operations via external entry points 122b and 174b respectively. Operations that could enter memory subsystem 108b via entry points 122b and 174b may include external snoop operations, as examples. The entry point operations at each arbiter contend with other operations received by the arbiter for access to the arbiter's single pipeline output to the next lower cache level. If a first load request (from node 105a) hits via an external snoop to a modified line of L1 cache 103 in second node 102b, the external snoop operation that produced the hit will enter memory subsystem 108b at entry point 122b and contend for access to L2 store queue 128b via arbiter 120b. The tenure of the external operation at the arbiter 120b input varies with the number of operations with which it is contending and it is not known beforehand how long the tenure will last. If a second load request hits to a modified line of a lower level cache of second node 105b via a second external snoop and enters memory subsystem 108b via an external entry point such as entry point 174b, the second external snoop may win its arbitration and generate a second intervention operation that makes it out to system bus 124 before the intervention generated by the first external snoop. To prevent this mis-ordering of the load request responses, an intervention state machine 176 stalls the later issued intervention from arbitrating until the intervention resulting from the earlier issued load request has passed the common arbitration point to maintain ordering. When the earlier issued load request passes the common arbiter, intervention state machine 176 permits the later issued operation to contend for arbitration once again. Thus, intervention state machine 176 leverages the inherent ordering of the memory subsystem store queues to manage the ordering of multiple pending global interventions without requiring additional intervention buffers, and without using tags or other mechanisms to dynamically track the correct ordering. By guaranteeing that multiple pending interventions remain in order, intervention state machine 176 insures that memory subsystem 106b complies with a bus protocol that executes interventions as data only transactions.

It will be apparent to those skilled in the art having the benefit of this disclosure that the present invention contemplates various improvements suitable for use with a single chip multiprocessor device and system. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A computer system, comprising:
    a set of processors connected to a memory subsystem via
        a local interconnect, the memory subsystem comprising:
        a load miss block adapted for queuing load type operations;
        a store miss block adapted for queuing store type operations;
        an arbiter configured to receive and arbitrate queued operations from the load and store miss blocks as well as operations directly from the set of processors; and
        means for reloading an L1 cache with data from a first data source via a reload data bus upon completion of a first operation arbitrated through the arbiter and means for reloading the L1 cache with data from a second data source via the reload data bus upon completion of a second operation arbitrated through the arbiter.

2. The computer system of claim 1, wherein the means for reloading the L1 cache are connected to an L2 cache and configured to reload the L2 cache with the reload data while the L1 cache is being reloaded with the reload data.

3. The computer system of claim 1, wherein the first data source comprises another L1 cache associated with the set of processors.

4. The computer system of claim 1, wherein the second data source comprises a bus interface unit adapted for retrieving data from a system bus.

5. The computer system of claim 1, wherein the local interconnect comprises a uni-directional address bus connecting the set of processors to the memory subsystem.

6. The computer system of claim 1, wherein the memory subsystem includes a memory subsystem pipeline connected to the output of the arbiter.

7. The computer system of claim 6, wherein an arbitrated operation completes when it reaches the last stage of the pipeline.

8. The computer system of claim 1, wherein the set of processors are fabricated on a single semiconductor substrate and packaged in a single device package.

9. A memory subsystem of a multiprocessor comprising a set of processors, the subsystem comprising:
    a load miss block adapted for queuing load type operations;
    a store miss block adapted for queuing store type operations;
    an arbiter configured to receive and arbitrate queued operations from the load and store miss blocks as well as operations directly from the set of processors; and
    means for reloading an L1 cache with data from a first data source via a reload data bus upon completion of a first operation arbitrated through the arbiter and means for reloading the L1 cache with data from a second data source via the reload data bus upon completion of a second operation arbitrated through the arbiter.

10. The memory subsystem of claim 9, wherein the means for reloading the L1 cache are connected to an L2 cache and configured to reload the L2 cache with the reload data while the L1 cache is being reloaded with the reload data.

11. The memory subsystem of claim 9, wherein the first data source comprises another L1 cache associated with the set of processors.

12. The memory subsystem of claim 9, wherein the second data source comprises a bus interface unit adapted for retrieving data from a system bus.

13. The memory subsystem of claim 9, wherein the local interconnect comprises a uni-directional address bus connecting the set of processors to the memory subsystem.

14. The memory subsystem of claim 9, wherein the memory subsystem includes a memory subsystem pipeline connected to the output of the arbiter.

15. The memory subsystem of claim 14, wherein an arbitrated operation completes when it reaches the last stage of the pipeline.

16. A method of reloading an L1 cache in a multiprocessor device, comprising:
    forwarding a first operation to an arbiter, wherein the first operation requires data from a first data source;

forwarding a second operation to the arbiter, wherein the second operation requires data from a second data source;

in response to the first operation being selected and initiated by the arbiter, reloading the L1 cache with data from the first data source via a reload data bus upon completion of the first operation;

in response to the second operation being selected and initiated by the arbiter, reloading the L1 cache with data from the second data source via the reload data bus upon completion of a second operation.

17. The method of claim 16, wherein the step of completing the first operation includes forwarding the first operation to a memory subsystem pipeline.

18. The method of claim 17, wherein the completing of the first operation and the reloading of the pipeline occurs when the first operation reaches the last stage of the pipeline.

19. The method of claim 16, further comprising, reloading an L2 cache with the reload data when the reload data completes, wherein the reload of the L1 cache and the reload of the L2 cache occurs concurrently.

20. The method of claim 16, wherein the first data source comprises another L1 cache of the multiprocessor device.

21. The method of claim 16, wherein the second data source comprises an bus interface unit adapted for retrieving data from a system bus.

* * * * *